(12) United States Patent
Chuang

(10) Patent No.: US 11,796,022 B1
(45) Date of Patent: Oct. 24, 2023

(54) MAGNETIC LEVITATION BUFFER DEVICE

(71) Applicant: EHOMA INDUSTRIAL CORPORATION, Taichung (TW)

(72) Inventor: Chun-Huan Chuang, Taichung (TW)

(73) Assignee: EHOMA INDUSTRIAL CORPORATION, Taichung (TW)

(*) Notice: Subject to any disclaimer, the term of this patent is extended or adjusted under 35 U.S.C. 154(b) by 0 days.

(21) Appl. No.: 17/864,867

(22) Filed: Jul. 14, 2022

(51) Int. Cl.
*F16F 15/03* (2006.01)
*F16F 6/00* (2006.01)
*B60R 11/02* (2006.01)

(52) U.S. Cl.
CPC ........... *F16F 6/005* (2013.01); *F16F 15/03* (2013.01); *B60R 11/0241* (2013.01)

(58) Field of Classification Search
CPC ....... B60R 11/0241; B62J 11/00; F16F 6/005; F16F 15/03; F16F 2222/06; F16F 15/022
See application file for complete search history.

(56) References Cited

U.S. PATENT DOCUMENTS

| | | | | | |
|---|---|---|---|---|---|
| 3,638,963 | A | * | 2/1972 | Van Leeuwen | B60G 11/32 280/124.141 |
| 3,770,290 | A | * | 11/1973 | Bottalico | B60G 13/14 267/221 |
| 4,502,652 | A | * | 3/1985 | Breitbach | B64D 1/02 188/380 |
| 4,595,166 | A | * | 6/1986 | Kurokawa | F16C 39/063 188/267 |
| 4,950,931 | A | * | 8/1990 | Goldenberg | H02K 33/16 310/15 |
| 5,120,030 | A | * | 6/1992 | Lin | F16F 6/00 188/300 |
| 6,325,365 | B1 | * | 12/2001 | Fujita | F16F 6/005 188/161 |
| 10,336,174 | B1 | * | 7/2019 | Murphy | H01F 7/02 |
| 11,187,477 | B2 | * | 11/2021 | Snyder | F16F 15/03 |
| 11,421,751 | B2 | * | 8/2022 | Huang | F16F 3/10 |
| 2020/0262298 | A1 | * | 8/2020 | Agra | F16F 15/03 |
| 2021/0164742 | A1 | * | 6/2021 | Snyder | F16F 15/03 |
| 2022/0178420 | A1 | * | 6/2022 | Bailey | F16F 15/022 |
| 2022/0205507 | A1 | * | 6/2022 | Huang | F16F 15/08 |

* cited by examiner

*Primary Examiner* — Thomas W Irvin
(74) *Attorney, Agent, or Firm* — MUNCY, GEISSLER, OLDS & LOWE, P.C.

(57) ABSTRACT

A magnetic levitation buffer device includes a seat body, a first moving member, and a second moving member. The seat body has a housing space, and a first and a second buffer members disposed in opposite to each other therein. The first moving member has a first magnetic end movably disposed in the housing space. The first moving member abuts against the first buffer member. The second moving member has a second magnetic end movably disposed in the housing space. The second magnetic end and the first magnetic end are arranged in a face-to-face arrangement and magnetically repulsive to each other, whereby the second moving member contacts the second buffer member. With such configuration, the present invention applies the first buffer member and the second buffer member to absorb the vibration force, thereby reducing the vibration.

8 Claims, 6 Drawing Sheets

MAGNETIC LEVITATION BUFFER DEVICE

BACKGROUND OF THE INVENTION

1. Field of the Invention

The present invention relates to buffer devices, and more particularly, to a magnetic levitation buffer device for vibration reduction.

2. Description of the Related Art

With the popularization of smartphones, a smartphone is often applied as a navigation device or applied for obtaining various information. Meanwhile, the smartphone is usually temporarily placed on a fixing holder to avoid the inconvenience of holding the smartphone by hand.

The smartphone is typically held by a fixing holder to be installed on the head of a motorcycle or positioned on the panel in front of the car driver. However, the smartphone contains a plurality of delicate electronic components. The vibration generated while the motorcycle or vehicle moving on the road is transmitted to the smartphone and causes damage of the electronic components (such as the optical lens module). Also, the shaking of the motorcycle and the vehicle causes the fixing holder to vibrate as well, so that the shaking prevents a user from viewing the screen of the smartphone clearly. Hence, there is a need for a resolution of the issues above.

SUMMARY OF THE INVENTION

To improve the issues above, the present invention discloses a magnetic levitation buffer device, which applies the magnetic repulsion between two magnetic bodies to achieve the vibration reduction effect.

For achieving the aforementioned objectives, the present invention provides a magnetic levitation buffer device, comprising a seat body, a first moving member, and a second moving member. The seat body comprises a housing space, and a first buffer member and a second buffer member disposed in opposite to each other therein. The first moving member comprises a first magnetic end and a first installation end disposed on two opposite sides thereof. The first magnetic end is movably disposed in the housing space. A first abutting portion is disposed between the first magnetic end and the first installation end for abutting against the first buffer member.

The second moving member comprises a second magnetic end and a second installation end disposed on two opposite sides thereof. The second magnetic end is movably disposed in the housing space. A second abutting portion is disposed between the second magnetic end and the second installation end. The second magnetic end and the first magnetic end are arranged in a face-to-face arrangement and magnetically repulsive to each other, such that the second moving member contacts the second buffer member.

With the first buffer member and the second buffer member disposed on different layers for carrying out a double time absorption of the vibration force, the present invention achieves a double vibration reducing and buffer effect. Also, due to the magnetic repulsion between the first magnetic end of the first moving member and the second magnetic end of the second moving member, the first moving member and the second moving member are able to be restored to the original positions after being affected by the vibration.

In another embodiment, the present invention provides a magnetic levitation buffer device, comprising a seat body and a moving seat. The seat body comprises a housing space, and a first buffer member and a first magnetic member disposed in opposite in the housing space. The moving seat comprises a moving end and an installation end on one side of the moving seat. The moving end is movably disposed in the housing space, comprising a second magnetic end. The second magnetic end and the first magnetic end are arranged in a face-to-face arrangement and magnetically repulsive to each other, with an abutting portion disposed between the moving end and the installation end for abutting against the first buffer member.

With such configuration, the present invention applies the magnetic repulsion between the second magnetic member and the first magnetic member to achieve a vibration reduction effect.

DETAILED DESCRIPTION OF THE INVENTION

Figure 1:
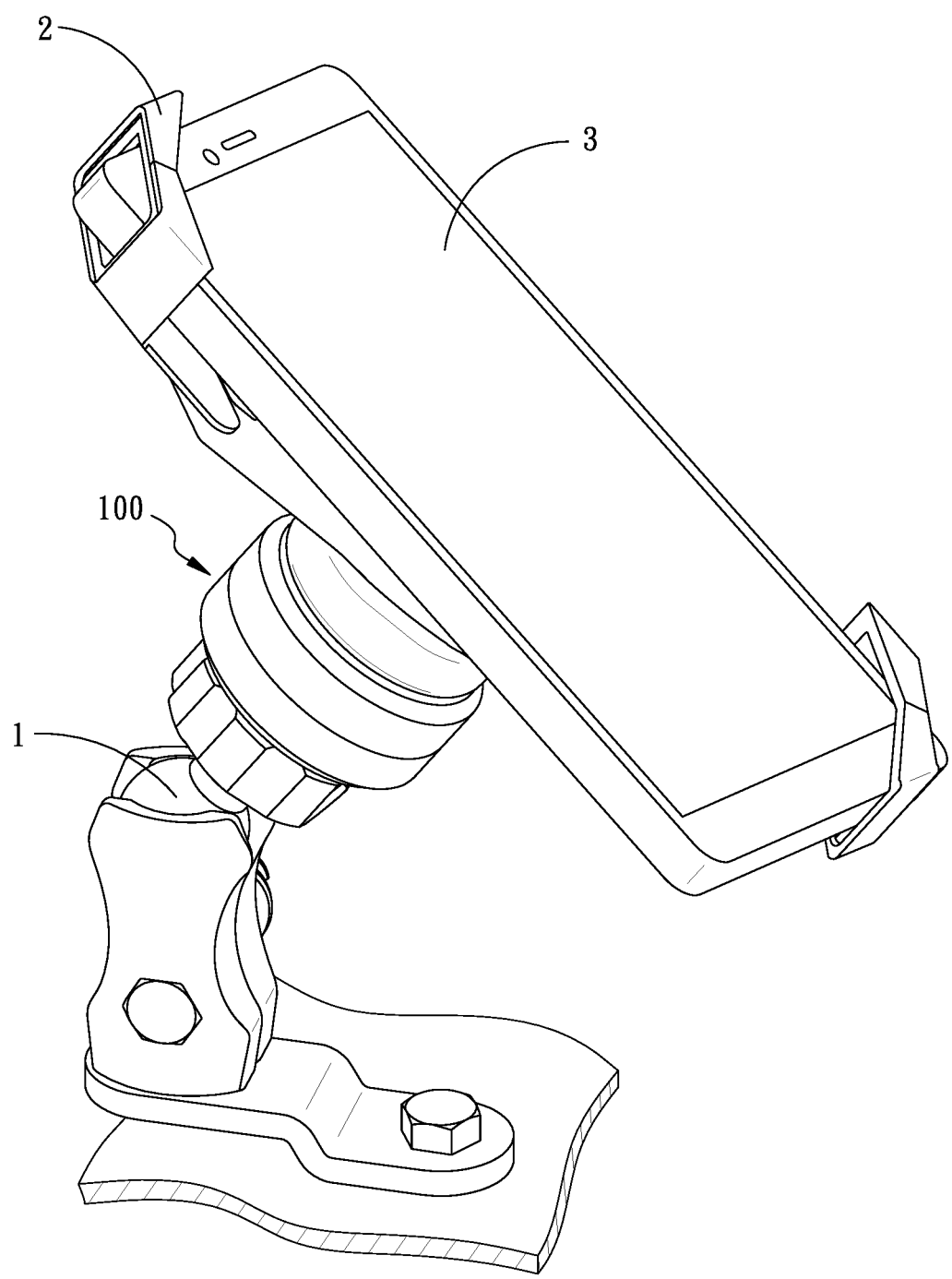
FIG. 1 is a perspective view of the magnetic levitation buffer device in accordance with an embodiment of the present invention disposed between the fixing seat and the support, with the smartphone clamped on the support.
Figure 2:
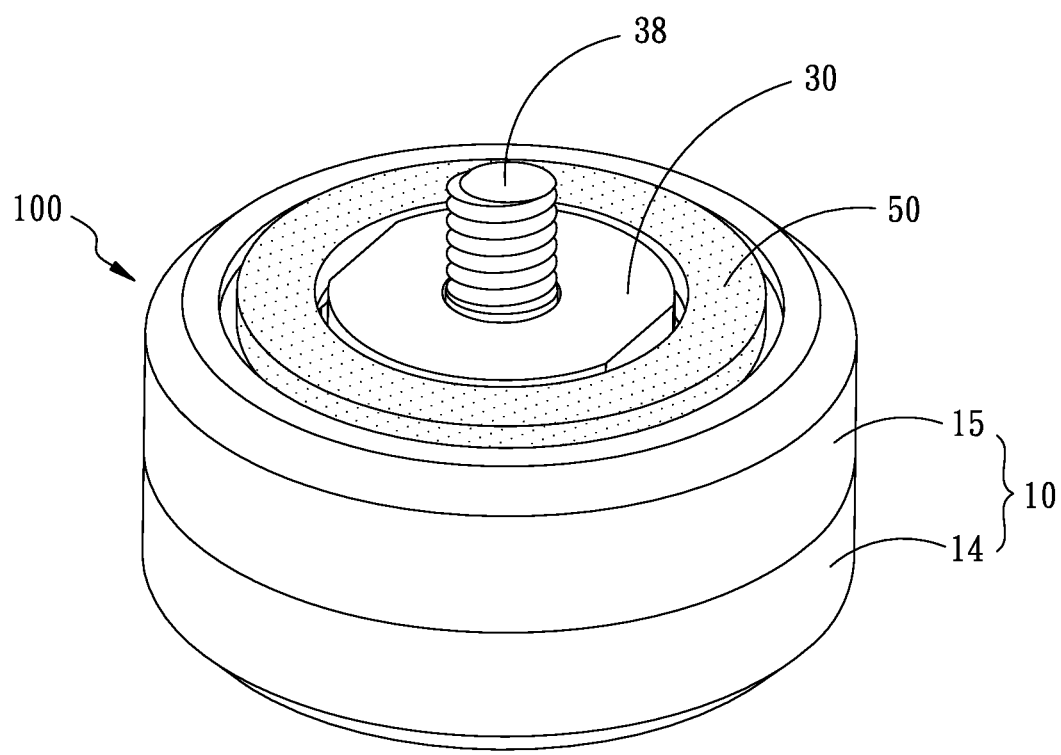
FIG. 2 is a perspective view of the magnetic levitation buffer device in accordance with an embodiment of the present invention.
Figure 3:
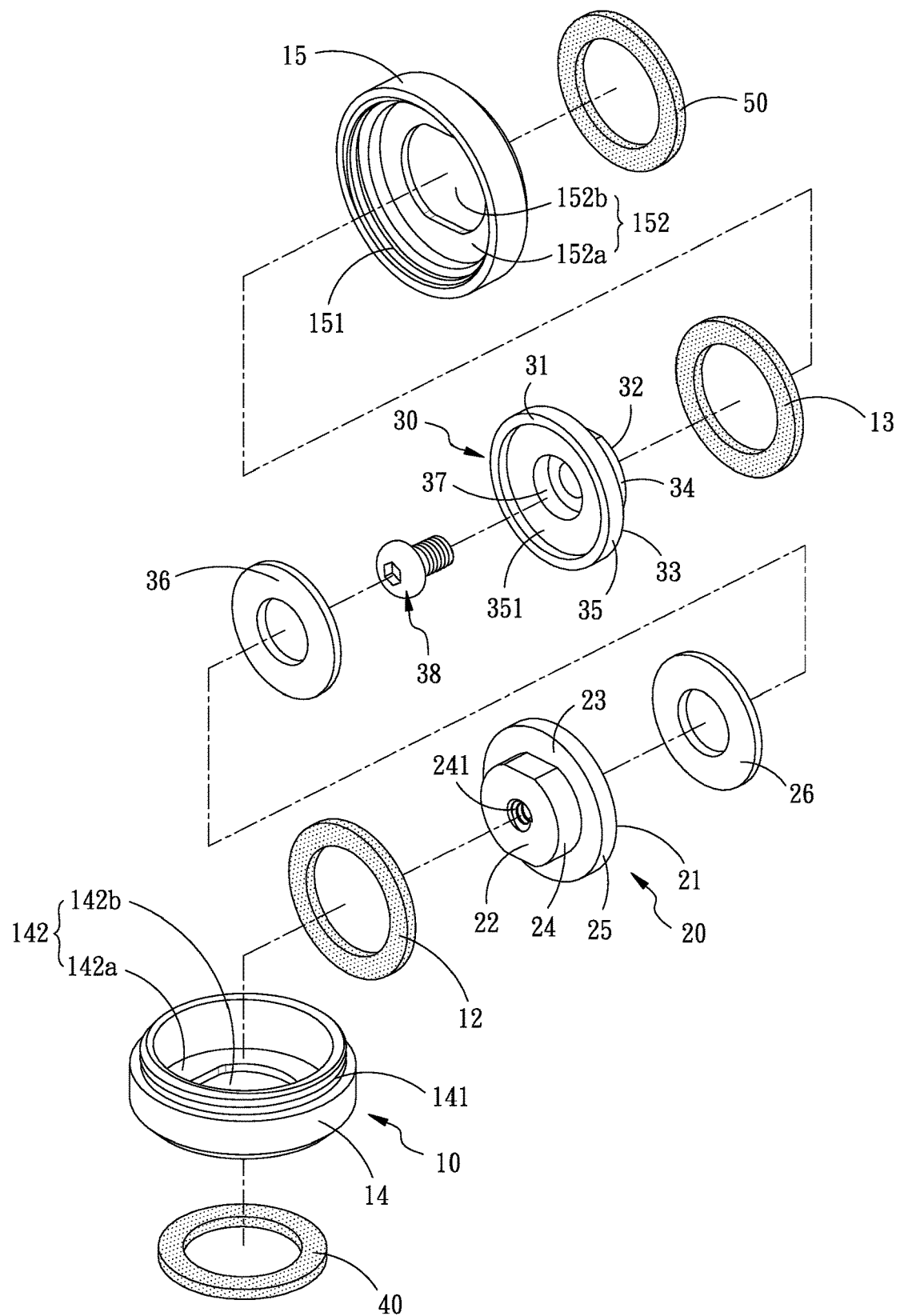
FIG. 3 is an exploded view of the magnetic levitation buffer device in accordance with an embodiment of the present invention.

The aforementioned and further advantages and features of the present invention will be understood by reference to the description of the preferred embodiments in conjunction with the accompanying drawings where the components are illustrated based on a proportion for explanation but not subject to the actual component proportion.

Referring to FIG. 1 to FIG. 5, a first embodiment of a magnetic levitation buffer device 100 of the present invention is illustrated. The magnetic levitation buffer device 100 is disposed between a fixing seat 1 and a support 2. The fixing seat 1 is fixed to a vehicle or a motorcycle, such as being dispose on one side of the head of the motorcycle. The support 2 is configured to clamp and hold a smartphone 3. When the vehicle or the motorcycle moves on a road and generates a vibration, the vibration force is transmitted through the fixing seat 1 to the present invention. The present invention is applied for reducing the vibration transmitted to the smartphone 3, so as to prevent the vibration from causing adverse effect upon the smartphone 3 or the capability of the user viewing the screen of the smartphone 3. Therein, the magnetic levitation buffer device 100 comprises a seat body 10, a first moving member 20, and a second moving member 30, wherein the first moving member 20 is connected with the fixing seat 1, and the second moving member 30 is connected with the support 2.

The seat body 10 comprises a housing space 11, and a first buffer member 12 and a second buffer member 13 disposed in opposite to each other in the housing space 11. In the embodiment, the first buffer member 12 and the second buffer member 13 are both formed in a ring shape and formed of polyurethane (PU) material. Alternatively, they are also allowed to be a spring or other objects having an elastic buffer property.

In the embodiment, the seat body 10 comprises a lower shell 14 and an upper shell 15 combined therewith, wherein the lower shell 14 and the upper shell 15 are formed of a ring shape and screwed to each other. For example, the lower shell 14 comprises an outer thread 141 which is screwed to an inner thread 151 of the upper shell 15. Therein, the lower shell 14 comprises a first inner ring portion 142, the first inner ring portion 142 comprises a first inner wall 142a and a first through hole 142b, the first inner wall 142a is located on one side inside the housing space 11, and the first through hole 142b is communicated with the housing space 11. The height of the upper shell 15 is smaller than the height of the lower shell 14. The upper shell 15 comprises a second inner ring portion 152, the second inner ring portion 152 comprises a second inner wall 152a and a second through hole 152b, the second inner wall 152a is located on another side inside the housing space 11, and the second through hole 152b is communicated with the housing space 11.

The first moving member 20 comprises a first magnetic end 21 and a first installation end 22. The first magnetic end 21 is movably disposed in the housing space 11. A first abutting portion 23 is disposed between the first magnetic end 21 and the first installation end 22. The first buffer member 12 is disposed between the first inner wall 142a and the first abutting portion 23 of the first moving member 20, such that the first moving member 20 abuts against the first buffer member 12 through the first abutting portion 23, thereby providing the buffer effect when the first moving member 20 generates a vibration.

In the embodiment, the first moving member 20 comprises a first axle portion 24 and a first disc portion 25 extending from the first axle portion 24. The first installation end 22 comprises a lock bore 241 which is connected with a thread bolt 1a of the fixing seat 1, so that the first moving member 20 is connected with the fixing seat 1. The first magnetic end 21 is disposed on the first disc portion 25, and the first installation end 22 is disposed on the first axle portion 24 and arranged away from the first disc portion 25. The first disc portion 25 comprises a first recess 251, in which a ring-shaped first magnetic body 26 is embedded for providing the magnetism. Therein, the first magnetic body 26 is a permanent magnet. The first axle portion 24 passes through the first through hole 142b of the lower shell 14.

The second moving member 30 is structurally similar to the first moving member 20. The second moving member 30 comprises a second magnetic end 31 and a second installation end 32 on two opposite sides thereof. The second magnetic end 31 is movably disposed in the housing space 11. A second abutting portion 33 is disposed between the second magnetic end 31 and the second installation end 32. The second buffer member 13 is disposed between the second inner wall 152a and the second abutting portion 33 of the second moving member 30. The second magnetic end 31 and the first magnetic end 21 are arranged in a face-to-face arrangement and magnetically repulsive to each other, such that the second abutting portion 33 of the second moving member 30 contacts the second buffer member 13, thereby providing the buffer effect when the second moving member 30 generates a vibration.

Figure 4:
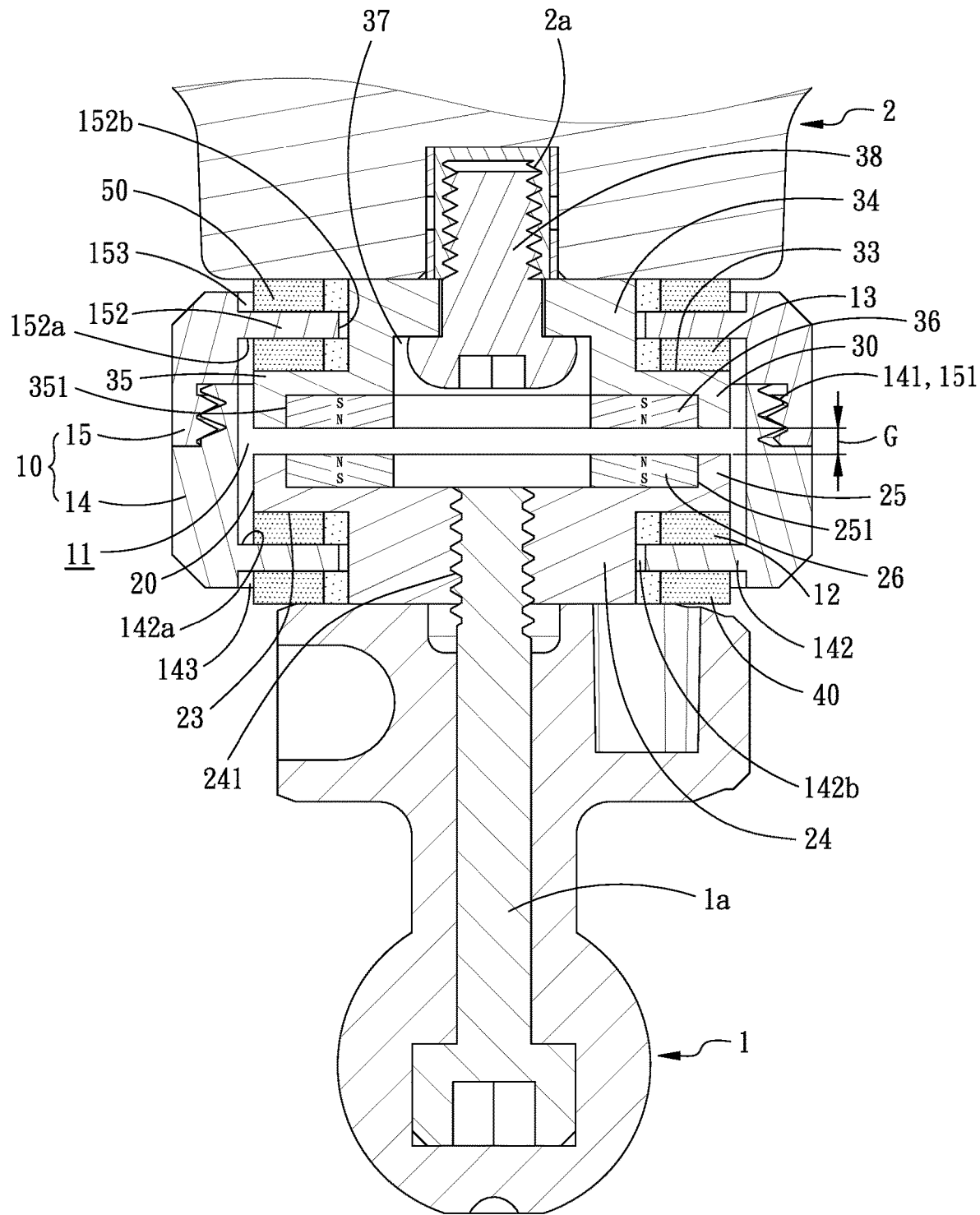
FIG. 4 is a sectional view illustrating the magnetic levitation buffer device in accordance with an embodiment of the present invention disposed between the fixing seat and the support.

In the embodiment, the second moving member 30 comprises a second axle portion 34 and a second disc portion 35 extending from the second axle portion 34. The second magnetic end 31 is disposed on the second disc portion 35, and the second installation end 32 is disposed on the second axle portion 34 away from the second disc portion 35. The second disc portion 35 comprises a second recess 351, in which a ring-shaped second magnetic body 36 is embedded for providing the magnetism. Therein, the second magnetic body 36 is a permanent magnet. The second axle portion 34 passes through the second through hole 152b of the lower shell 14. The N magnetic pole of the first magnetic body 26 is arranged to face the N magnetic pole of the second magnetic body 36, such that the second moving member 30 is magnetically levitated with respect to the first moving member 20 in the housing space 11, with an interval G normally remaining between the second moving member 30 and the first moving member 20, as shown by FIG. 4. Also, an installation bore 37 passes through the second axle portion 34 and the second disc portion 35, such that the second moving member 30 is screwed to a screw bore 2a of the support 2 by a screw member 38 passing through the installation bore 37, whereby the present invention is disposed between the support 2 and the fixing seat 1. Therefore, the present invention normally keeps the smartphone 3 in the magnetically levitated status for buffing the vibration generated by the vehicle or motorcycle.

In the embodiment, the depth of the first recess 251 is identical to the depth of the second recess 351, and the thickness of the first magnetic body 26 is identical to the thickness of the second magnetic body 36.

In the present invention, the outer side of the first inner ring portion 142 of the lower shell 14 comprises a first outer ring groove 143, in which a third buffer member 40 is disposed. Also, the depth of the first outer ring groove 143 is smaller than the height of the third buffer member 40, so that the third buffer member 40 protrudes from the bottom face of the lower shell 14; when the first moving member 20 is connected with the fixing seat 1, the lower shell 14 does not directly contact the fixing seat 1, wherein the third buffer member 40 separates the lower shell 14 and the fixing seat 1.

In the embodiment, the outer side of the second inner ring portion 152 of the upper shell 15 comprises a second outer ring groove 153, in which a fourth buffer member 50 is disposed. The depth of the second outer ring groove 153 is smaller than the height of the fourth buffer member 50, so that the fourth buffer member 50 protrudes from the top face of the upper shell 15; when the second moving member 30 is connected with the support 2, the upper shell 15 does not directly contact the back side of the support 2, wherein the fourth buffer member 50 separates the upper shell 15 and the support 2. Therein, the third buffer member 40 and the fourth buffer member 50 are both formed in a ring shape and formed of polyurethane (PU) material. Alternatively, they are also allowed to be a spring or other objects having an elastic buffer property.

Figure 5:
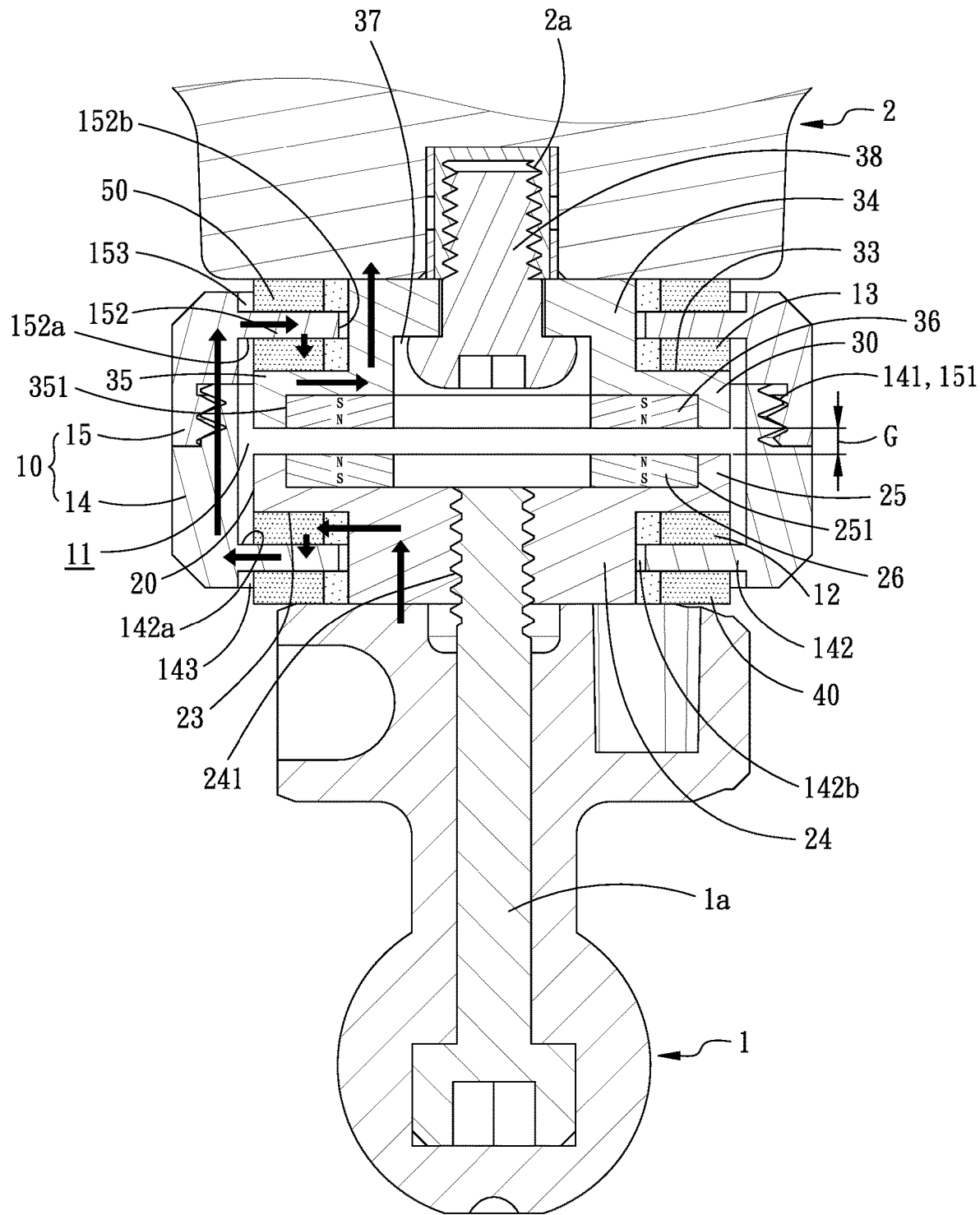
FIG. 5 is a schematic view illustrating vibration reduction effect of the magnetic levitation buffer device in accordance with an embodiment of the present invention.

Referring to FIG. 5, the schematic view illustrating the operation status of the present invention is provided. When the vehicle or motorcycle moves on the road and generates the vibration because of the bumpiness of the road surface, the vibration force (as pointed by the arrowhead in the drawing) is first transmitted from the fixing seat 1 to the first moving member 20. Because the first magnetic body 26 and the second magnetic body 36 are arranged in a face-to-face arrangement and magnetically repulsive to each other, the second moving member 30 is magnetically levitated with respect to the first moving member 20 in the housing space 11, such that the vibration force is not directly transmitted from the first moving member 20 to the second moving member 30. Therefore, the support 2 is prevented from being directly affected by the vibration force, and the effect caused by the vibration upon the object on the support 2 is reduced. Also, when the vibration force is transmitted to the moving member 20, the first buffer member 12 absorbs the vibration force on the first moving member 20 for a first time, reducing transmission of the vibration force, and when the reduced vibration force is then transmitted through the lower shell 14 and the upper shell 15 to the second moving member 30, the second buffer member 13 absorbs the reduced vibration force on the second moving member 30 for a second time, further reducing the possibly shaking of the second moving member 30. Therefore, the vibration effect caused by the movement of the vehicle or motorcycle imposed on the second moving member 30 is greatly reduced, thereby reducing the adverse effect caused by the vibration force on the object fixed on the support 2.

Notably, when the vibration force is excessive, causing the first moving member 20 or the second moving member 30 to shake and lean toward each other, the magnetic repulsion between the first magnetic body 26 and the second magnetic body 36 neutralizes the vibration force, such that the first moving member 20 or the second moving member 30 is restored to the original position, thereby maintaining the stable status of the support 2 and assuring the normal usage thereof.

Further, in the embodiment, the third buffer member 40 prevents the lower shell 14 from directly contacting the fixing seat 1, and the fourth buffer member 50 prevents the upper shell 15 from directly contacting the support 2. Therefore, the present invention increases the absorption of the vibration force, thereby reducing the transmission of the vibration force to the support 2.

With such configuration, the present invention applies the movable installation of the first moving member 20 and the second moving member 30, with the first buffer member 12 and the second buffer member 13 disposed on different layers for carrying out a double absorption to achieve a double vibration reduction effect. Therefore, the present invention reduces the adverse effect caused by the vibration force upon the smartphone 3 fixed on the support 2, thereby lowering the damage of the smartphone 3 due to vibration.

Figure 6:
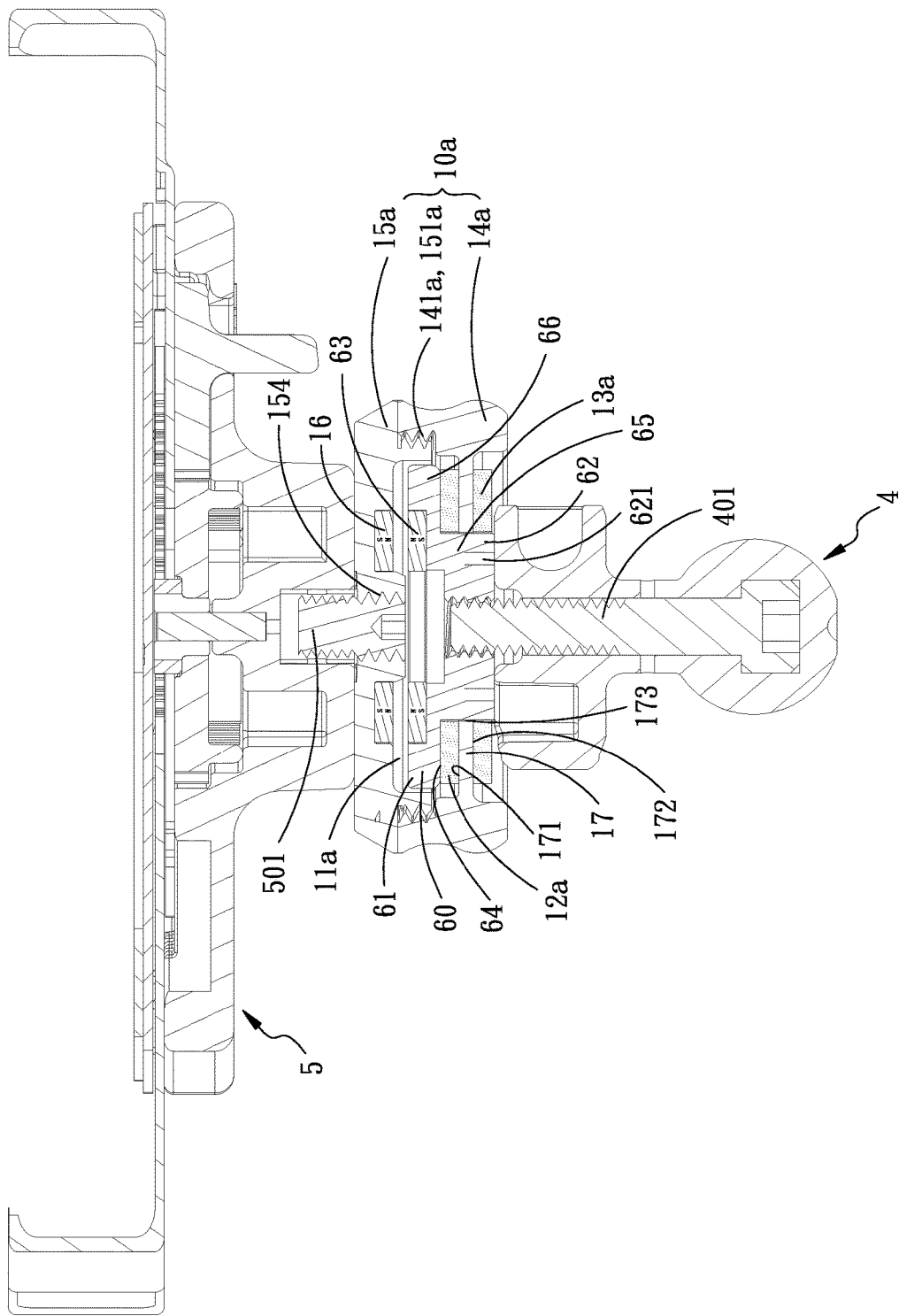
FIG. 6 is a sectional view of the magnetic levitation buffer device in accordance with another embodiment of the present invention.

Referring to FIG. 6, the second embodiment of the magnetic levitation buffer device 100a is illustrated. In the embodiment, the magnetic levitation buffer device 100a comprises a seat body 10a and a moving seat 60. The seat body 10a is connected with a fixing seat 4 and a support 5, and the support 5 is configured to clamp the smartphone 3 of the aforementioned embodiment.

The seat body 10a comprises a housing space 11a, and a first buffer member 12a and a first magnetic member 16 disposed in opposite to each other in the housing space 11a. The first magnetic member 16 is a permanent magnet. In the second embodiment, the seat body 10a comprises a lower shell 14a and an upper shell 15a combined therewith. The lower shell 14a comprises an inner thread 141a which is screwed to an outer thread 151a of the upper shell 15a. The height of the upper shell 15a is smaller than the height of the lower shell 14a. The lower shell 14a comprises an inner ring portion 17, the inner ring portion 17 comprises an inner wall 171 and an outer wall 172, the inner wall 171 comprises a first buffer member 12a, the outer wall 172 comprises a second buffer member 13a, and the first magnetic member 16 is embedded in a recess of the upper shell 15a.

The moving seat 60 comprises a moving end 61 and an installation end 62 on one side of the moving seat 60. The moving end 61 comprises a recess, in which a second magnetic member 63 is embedded. The second magnetic member 63 is a permanent magnet. The moving end 61 is movably disposed in the housing space 11a. The second magnetic member 63 and the first magnetic member 16 are arranged in a face-to-face arrangement and magnetically repulsive to each other. An abutting portion 64 is disposed between the moving end 61 and the installation end 62 for abutting against the first buffer member 12a. In other words, the first buffer member 12a is disposed between the inner wall 171 and the abutting portion 64. In the embodiment, the moving seat 60 comprises an axle portion 65 and a disc portion 66 extending from the axle portion 65. The second magnetic member 63 is disposed on the disc portion 66. The installation end 62 is disposed on the axle portion 65 away from the disc portion 66. The inner ring portion 17 comprises a through hole 173 which is communicated with the housing space 11a, and the axle portion 65 passes through the through hole 173.

Further, the installation end 62 comprises a lock bore 621 for connecting the thread bolt 401 of the fixing seat 4. The upper shell 15a comprises a fixing portion 154 which is a thread bore for connecting the thread bolt 501 of the support 5.

With the foregoing configuration, the second magnetic member 63 and the first magnetic member 16 are arranged in a face-to-face arrangement and magnetically repulsive to each other, so that the moving seat 60 is magnetically levitated with respect to the seat body 10a in the housing space 11a, preventing the vibration force from being directly transmitted from the moving seat 60 to the upper shell 15a, such that the support 5 is not affected by the vibration force, lowering the effect of the vibration force upon the object on the support 5. Also, the repulsion between the second magnetic member 63 and the first magnetic member 16 neutralizes the overall vibration, allowing the support 5 to be restored to the original levitated position after the vibration, assuring the stableness of the object. In addition, the second buffer member 13a prevents the lower shell 14a from directly contacting the fixing seat 4, thereby increasing the absorption of the vibration force, reducing the transmission of the vibration force to the support 5.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A magnetic levitation buffer device, comprising:
   a seat body comprising a housing space, and a first buffer member and a second buffer member in opposite to the first buffer member disposed in the housing space;
   a first moving member comprising a first magnetic end and a first installation end disposed on two opposite sides of the first moving member, the first magnetic end movably disposed in the housing space, a first abutting portion disposed between the first magnetic end and the first installation end for abutting against the first buffer member; and
   a second moving member comprising a second magnetic end and a second installation end disposed on two opposite sides of the second moving member, the second magnetic end movably disposed in the housing space, a second abutting portion disposed between the second magnetic end and the second installation end, the second magnetic end and the first magnetic end being arranged in a face-to-face arrangement and magnetically repulsive to each other, such that the second moving member contacts the second buffer member.

2. The magnetic levitation buffer device of claim 1, wherein the seat body comprises a lower shell and an upper shell combined therewith; the lower shell comprises a first inner ring portion, and the first inner ring portion comprises a first inner wall; the first buffer member is disposed between the first inner wall and the first abutting portion; the upper shell comprises a second inner ring portion, and the second inner ring portion comprises a second inner wall; the second buffer member is disposed between the second inner wall and the second abutting portion.

3. The magnetic levitation buffer device of claim 2, wherein the first moving member comprises a first axle portion and a first disc portion extending from the first axle portion; the first magnetic end is disposed on the first disc portion; the first installation end is disposed on the first axle portion away from the first disc portion; the second moving member comprises a second axle portion and a second disc portion extending from the second axle portion; the second magnetic end is disposed on the second disc portion; the second installation end is disposed on the second axle portion away from the second disc portion.

4. The magnetic levitation buffer device of claim 3, wherein the first inner ring portion comprises a first through hole communicated with the housing space; the first axle portion passes through the first through hole; the second inner ring portion comprises a second through hole communicated with the housing space; the second axle portion passes through the second through hole.

5. The magnetic levitation buffer device of claim 4, wherein a height of the upper shell is smaller than a height of the lower shell, and the upper shell is screwed to the lower shell; the first installation end comprises a lock bore for connecting a fixing seat; the second installation end comprises an installation bore for connecting a support.

6. The magnetic levitation buffer device of claim 5, wherein the first disc portion comprises a first recess, in which a ring-shaped first magnetic body is embedded; the second disc portion comprises a second recess, in which a ring-shaped second magnetic body is embedded; a depth of the first recess is identical to a depth of the second recess; the first magnetic body and the second magnetic body are both a permanent magnet.

7. The magnetic levitation buffer device of claim 5, wherein an outer side of the first inner ring portion comprises a first outer ring groove, in which a third buffer member is disposed; a depth of the first outer ring groove is smaller than a height of the third buffer member.

8. The magnetic levitation buffer device of claim 7, wherein an outer side of the second inner ring portion comprises a second outer ring groove, in which a fourth buffer member is disposed; a depth of the second outer ring groove is smaller than a height of the fourth buffer member.

* * * * *